United States Patent
Bian et al.

(10) Patent No.: US 11,490,016 B2
(45) Date of Patent: Nov. 1, 2022

(54) ZOOMING METHOD AND ELECTRONIC DEVICE USING THE SAME

(71) Applicant: ArcSoft Corporation Limited, Zhejiang (CN)

(72) Inventors: Qiaoling Bian, Zhejiang (CN); Yanqing Lu, Zhejiang (CN); Jin Wang, Zhejiang (CN)

(73) Assignee: ArcSoft Corporation Limited, Zhejiang (CN)

( * ) Notice: Subject to any disclaimer, the term of this patent is extended or adjusted under 35 U.S.C. 154(b) by 0 days.

(21) Appl. No.: 16/604,574

(22) PCT Filed: Sep. 25, 2019

(86) PCT No.: PCT/CN2019/107707
§ 371 (c)(1),
(2) Date: Oct. 11, 2019

(87) PCT Pub. No.: WO2020/155656
PCT Pub. Date: Aug. 6, 2020

(65) Prior Publication Data
US 2021/0368104 A1    Nov. 25, 2021

(30) Foreign Application Priority Data
Jan. 30, 2019   (CN) .................. 201910092913.3

(51) Int. Cl.
*H04N 5/232* (2006.01)
*H04N 5/247* (2006.01)

(52) U.S. Cl.
CPC ..... *H04N 5/23296* (2013.01); *H04N 5/23229* (2013.01); *H04N 5/247* (2013.01); *H04N 5/23245* (2013.01)

(58) Field of Classification Search
CPC ........... H04N 5/23296; H04N 5/23229; H04N 5/247; H04N 5/23245; H04N 5/232933;
(Continued)

(56) References Cited

U.S. PATENT DOCUMENTS

2016/0105615 A1    4/2016  Chang et al.
2016/0316147 A1*  10/2016  Bernstein ......... H04N 5/232939
(Continued)

FOREIGN PATENT DOCUMENTS

CN    101924879 A    12/2010
CN    104461288 A     3/2015
(Continued)

OTHER PUBLICATIONS

EP search report dated Mar. 29, 2021 in European application No. 19820657.5.

*Primary Examiner* — Lin Ye
*Assistant Examiner* — Tuan H Le
(74) *Attorney, Agent, or Firm* — Gang Yu

(57) ABSTRACT

A zooming method and an electronic device using the same are provided. The zooming method includes: acquiring a first image by a first camera unit; acquiring a current frame image by scaling the first image according to a zoom instruction; acquiring a second image by a second camera unit; and switching the first camera unit to the second camera unit for outputting the second image.

19 Claims, 5 Drawing Sheets

(58) Field of Classification Search
CPC .......... H04N 5/23216; H04N 5/23287; H04N 5/2257; H04N 5/232935; H04N 5/232939; H04N 5/23212; H04N 5/23219; H04N 5/2258; H04M 1/026; H04M 1/0264; H04M 1/0266
See application file for complete search history.

(56) References Cited

U.S. PATENT DOCUMENTS

| | | |
|---|---|---|
| 2016/0381289 A1 | 12/2016 | Kim et al. |
| 2018/0152623 A1 | 5/2018 | Li |
| 2018/0332223 A1 | 11/2018 | Lin et al. |
| 2019/0028650 A1 | 1/2019 | Bernstein et al. |
| 2020/0092486 A1* | 3/2020 | Guo .................. H04N 5/23245 |

FOREIGN PATENT DOCUMENTS

| | | |
|---|---|---|
| CN | 104980644 A | 10/2015 |
| CN | 105959553 A | 9/2016 |
| CN | 106303258 A | 1/2017 |
| CN | 106341611 A | 1/2017 |
| CN | 106385541 A | 2/2017 |
| CN | 106454132 A | 2/2017 |
| CN | 106791378 A | 5/2017 |
| CN | 108604373 A | 9/2018 |
| EP | 3122021 A2 | 1/2017 |
| JP | 2005099265 A | 4/2005 |
| JP | 2013143753 A | 7/2013 |
| KR | 20170051526 A | 5/2017 |

* cited by examiner

ZOOMING METHOD AND ELECTRONIC DEVICE USING THE SAME

CROSS-REFERENCE TO RELATED APPLICATIONS

The present disclosure claims priority of Chinese Patent Application No. 201910092913.3, filed to China Patent Office on Jan. 31, 2019, named "Zooming Method and Electronic Device Using the Same". Contents of the present disclosure are hereby incorporated by reference in entirety of the Chinese Patent Application.

TECHNICAL FIELD

The embodiments of the present disclosure relate to camera technology, and in particular to a zooming method and an electronic device using the same.

BACKGROUND

In recent years, with the continuous development of electronic technology, various electronic products, especially electronic products with camera devices, such as televisions (TVs), mobile phones, desktop computers, notebook computers, tablet computers, personal digital assistants (PDAs), etc., are widely used in various fields of life. At the same time, the demand for these camera devices is increasing, and product manufacturers have developed new functions one after another to meet the requirements of users.

Since the world's first mobile phone with camera function was launched in 2000, the camera function has become an indispensable function of the mobile phone, and also one of the functions that customers pay special attention to at present. The existed dual-camera smartphones or tablet computers typically have two cameras mounted on the front and back of the device respectively, or both mounted on the back of the device. A dual-camera commonly refers to a wide-angle lens and a telephoto lens mounted on the device, which can display clear images of close shot and long shot respectively according to the choices of users.

Limited to the size and weight of portable electronic devices (such as smartphones or tablet computers), smart electronic devices based on multi-camera will become a trend of development to obtain better camera effects. However, how to achieve intelligent zoom and the like through the cooperation, combination and the switching of the multiple cameras has become one of the focuses of the smart electronic devices based on multi-camera.

SUMMARY

In an embodiment of the present disclosure, a zooming method is provided for an electronic device having a plurality of camera units, the zooming method includes: a first image is acquired by a first camera unit; a current frame image is acquired by scaling the first image according to a zoom instruction; a second image is acquired by a second camera unit; the first camera unit is switched to the second camera unit for outputting the second image.

In an optional embodiment, the current frame image is acquired at the moment when the zoom instruction input is completed.

In an optional embodiment, the first camera unit and the second camera unit have different fields of view.

In an optional embodiment, the step that the first camera unit is switched to the second camera unit for outputting the second image includes: the field of view of the first camera unit is compared against the field of view of the second camera unit; the first threshold value is set; the zoom magnification of the current frame image is compared against the first threshold value, and a comparison result is obtained; and the first camera unit is switched to the second camera unit according to the comparison result.

In an optional embodiment, when the electronic device have two camera units with different fields of view, the first threshold value may be set to be not less the zoom magnification of the camera unit which has a smaller field of view in both the first camera unit and the second camera unit.

In an optional embodiment, when the field of view of the first camera unit is larger than the field of view of the second camera unit, the first threshold value is set to be not less than the zoom magnification of the second camera unit; the zoom magnification of the current frame image is compared against the first threshold value, and the first camera unit is switched to the second camera unit when the comparison result indicates the zoom magnification of the current frame image is not less than the first threshold value; and when the field of view of the first camera unit is smaller than the field of view of the second camera unit, the first threshold value is set to be not less than the zoom magnification of the first camera unit; the zoom magnification of the current frame image is compared against the first threshold value, and the first camera unit is switched to the second camera unit when the comparison result indicates the zoom magnification of the current frame image is not less than the zoom magnification of the first camera unit and is less than the first threshold value.

In an optional embodiment, when the field of view of the first camera unit is larger than the field of view of the second camera unit and there exists at least one camera unit having a field of view that is less than the second camera unit, a camera unit is regarded as a third camera unit if the field of view of the camera unit is less than the field of view of the second camera unit and the difference between the fields of view of the camera unit and the second camera unit is smallest, the first threshold value is set to be not less than the zoom magnification of the second camera and not greater than the zoom magnification of the third camera unit; and the first camera unit is switched to the second camera unit when the zoom magnification of the current frame image is not less than the first threshold value and is less than the zoom magnification of the third camera unit.

In an optional embodiment, when the field of view of the first camera unit is smaller than the field of view of the second camera unit and there exists at least one camera unit having a field of view that is less than the first camera unit, a camera unit is regarded as a third camera unit if the field of view of the camera unit is less than the field of view of the first camera unit and the difference between the fields of view of the camera unit and the first camera unit is smallest, the first threshold value is set to be not less than the zoom magnification of the first camera unit and not greater than the zoom magnification of the third camera unit; and the first camera unit is switched to the second camera unit when the zoom magnification of the current frame image is not less than zoom magnification of the first camera unit and is less than the zoom magnification of the first threshold value.

In an optional embodiment, when the field of view of the first camera unit is smaller than the field of view of the second camera unit and there exists at least one camera unit having a field of view between the fields of view of the first camera unit and the second camera unit, a camera unit is regarded as a third camera unit if the field of view of the camera unit is less than the field of view of the second camera unit and the difference between the fields of view of the camera unit and the second camera unit is smallest, the first threshold value is set to be not less than the zoom magnification of the third camera and not greater than the zoom magnification of the first camera unit; and the first camera unit is switched to the second camera unit when the zoom magnification of the current frame image is not less than zoom magnification of the third camera unit and is less than the first threshold value.

In an optional embodiment, when there exist a plurality of camera units having fields of view between the fields of view of the first camera unit and the second camera unit, a camera unit is regarded as a third camera unit if the field of view of the camera unit is less than the field of view of the second camera unit and the difference between the fields of view of the camera unit and the second camera unit is smallest, and a camera unit is regarded as a fourth camera unit if the field of view of the camera unit is less than the second camera unit and the difference between the fields of view of the camera unit and the second camera unit is only greater than the difference between the fields of view of the third camera unit and the second camera unit, the first threshold value is set to be not less than the zoom magnification of the third camera and not greater than the zoom magnification of the fourth camera unit; and the first camera unit is switched to the second camera unit when the zoom magnification of the current frame image is not less than magnification of the third camera unit and is less than the first threshold value.

In an optional embodiment, at least two of the plurality of camera units have different fields of view, and the zooming method is configured to realize the switch between any two of the plurality of camera units having different fields of view.

In an optional embodiment, the zooming method further includes: setting an adjustment coefficient to deform the current frame image or the second image.

In an optional embodiment, setting the adjustment coefficient to deform the current frame image or the second image includes: acquiring a deformation parameter of the current frame image and the second image by matching the current frame image and the second image; calculating a difference between the zoom magnification of the current frame image and the first threshold value; setting the adjustment coefficient to the deformation parameter and the difference; and performing deformation on the current frame image or the second image according to the adjustment coefficient.

In an optional embodiment, acquiring the deformation parameter of the current frame image and the second image by matching the current frame image and the second image includes: marking pixel points, feature points or feature blocks on the current frame image and the second image respectively; and matching the current frame image and the second image through an image registration method.

In an optional embodiment, the setting of the adjustment coefficient is related to the deformation coefficient; when the difference between the zoom magnification of the current frame image and the first threshold value is larger, the adjustment coefficient is smaller; and when the difference between the zoom magnification of the current frame image and the first threshold value is smaller, the adjustment coefficient is larger.

In another embodiment of the present disclosure, an electronic device having a plurality of camera units is provide, which includes: at least two camera units having different fields of view, for acquiring the first image and the second image; an input unit for acquiring a zoom instruction; a processing unit for acquiring a current frame image by scaling the first image according to the zoom instruction; a control unit for switching one camera unit to another camera unit of the at least two camera units having different fields of view according to the zoom instruction; and a display unit for outputting the second image.

In an optional embodiment, the processing unit is further configured to setting an adjustment coefficient for performing the deformation on the current frame image or the second image.

In another embodiment of the present disclosure, a storage medium is provided, the storage medium includes a stored program, and a device in which the storage medium is stored is controlled to execute any zooming methods as described above when the program is running.

In another embodiment of the present disclosure, an electronic device is provided, which includes: a processor; and a memory for storing executable instructions of the processor; and the processor is configured to perform any zooming methods as described above by executing the executable instructions.

BRIEF DESCRIPTION OF THE DRAWINGS

The accompanying drawings are used to provide further understanding of the present disclosure, and are part of the description. The exemplary embodiments and description are used to explain the present disclosure rather than limit the present disclosure. In the accompanying drawings.

DETAILED DESCRIPTION

In order to help those skilled in the art to better understand the solution of the present disclosure, the following will clearly and completely describe the technical solution in the embodiments of the present disclosure with reference to the accompanying drawings in the embodiments of the present disclosure. It is apparent that the described embodiments are merely a part of the embodiments of the present disclosure, and not all of the embodiments. Based on the embodiments of the present disclosure, all other embodiments can be obtained by those skilled in the art without creative efforts shall fall within the scope of the present disclosure.

It should be noted that the terms "first", "second" and the like in the specification and claims of the present disclosure are used to distinguish similar objects, and are not necessarily used to describe a particular sequence or order. It is to be understood that the data used in this manner may be interchanged as appropriate, so that the embodiments of the present disclosure described herein can be implemented in a sequence other than other those illustrated or described herein. In addition, the terms "comprise" and "include" and any variations thereof are intended to cover non-exclusive inclusion. For example, a process, method, system, product or device that includes a series of steps or elements is not necessarily limited to those steps or elements that are clearly listed, but may include other steps or elements that are not clearly listed or inherent to such process, method, product or device.

The embodiments of the present disclosure can be applied to an electronic device having multiple camera units, and the electronic device can include: a smartphone, a mobile phone, a tablet computer, an e-reader, a desktop computer, a workstation, a server, a personal digital assistant (PDA), a portable multimedia player (PMP), a medical device, a camera device or a wearable device (such as a watch, a bracelet, glasses, a headset, etc.), an electronic clothing, an implantable skin chip, a vehicle electronic device, and so on.

The following will explain a flowchart of a zooming method according to an embodiment of the present disclosure. It should be noted that the steps illustrated in the flowchart of the accompanying drawings may be executed in a computer system such as a set of computer executable instructions, and, although the logical order are shown in the flowchart, the steps shown or described may be performed in an order different than that herein in some circumstances.

Figure 1:
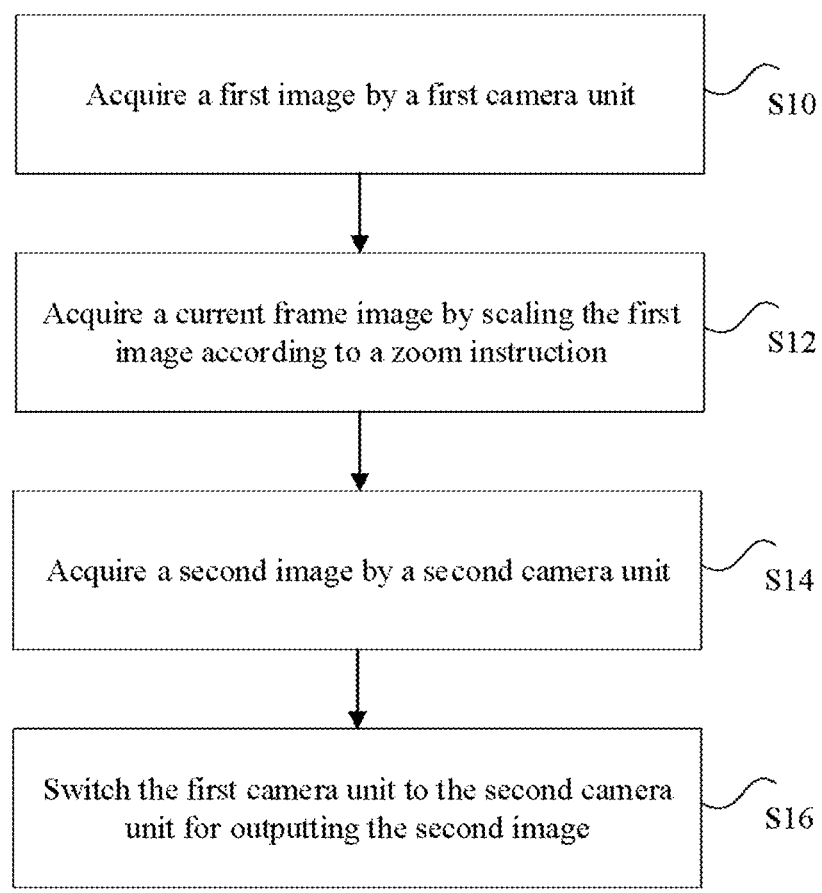
FIG. 1 is a flowchart of a zooming method according to an embodiment of the present disclosure.

FIG. 1 is a flowchart of a zooming method according to an embodiment of the present disclosure. As shown in FIG. 1, the method may include the following steps S10-S16.

At step S10, a first image is acquired by a first camera unit.

At step S12, a current frame image is acquired by scaling the first image according to a zoom instruction.

At step S14, a second image is acquired by a second camera unit.

At step S16, the first camera unit is switched to the second camera unit for outputting the second image.

In the embodiment of the present disclosure, through the above described steps, the first image is acquired by the first camera unit; the current frame image is acquired by scaling the first image according to the zoom instruction; the second image is acquired by the second camera unit; and the first camera unit is switched to the second camera unit for outputting the second image, so it is possible to switch the first camera unit to the second camera unit according to the zoom instruction, to optimize the image quality.

In the step S16, "the first camera unit is switched to the second camera unit for outputting the second image" may refer to the following meaning: the first image acquired by the first camera unit is switched to the second image acquired by the second camera unit. And when the zoom magnification which is from users reaches a threshold, the switching action is triggered, and the second image acquired by the second camera is output instead of the first image acquired by the first camera. In some embodiments of the present disclosure, for the purpose of saving power, when the second camera unit is triggered to take images, the first camera unit may be set to be closed or in a sleeping state. In another embodiments, the first camera unit may also keep open when the switching action is triggered. The first camera unit is forbidden to take images after or at the same time that the second camera starts to work.

The following will describe the above steps in detail.

At step S10, the first image is acquired by the first camera unit.

Optionally, in an embodiment of the present disclosure, the first camera unit may be a lens or a camera on the electronic device, and the first image may be a preview image.

At step S12, the current frame image is acquired by scaling the first image according to the zoom instruction.

Optionally, in an embodiment of the present disclosure, the zoom instruction of users may be received by an input unit, for scaling the first image. For example, the input unit may be a screen of an electronic device, and the zoom instructions may be input by sliding fingers on the screen or by pressing the numeric keyboard on the screen; for another example, the input unit may be a button on the electronic device, and the zoom instructions may be input by pressing the button to adjust zoom magnification.

Optionally, in an embodiment of the present disclosure, the current frame image is obtained when the zoom instruction input is completed, for example, when the finger slides action on the screen ends.

At step S14, the second image is acquired by the second camera unit.

Optionally, in an embodiment of the present disclosure, the second camera unit may be another lens or camera on the electronic device. The first camera unit and the second camera unit may be installed independently or integrated into one camera module. The first camera unit and the second camera unit may have different fields of view. For example, the first camera unit may be a wide-angle camera, and the second camera unit may be a telephoto camera; and for another example, the first camera unit may be wide-angle camera, and the second camera unit may be ultra-wide-angle camera.

At step S16, the first camera unit is switched to the second camera unit for outputting the second image.

Optionally, switching the first camera unit to the second camera unit may specifically include the following steps:

At step S161, the field of view (FOV) of the first camera unit is compared against the field of view of the second camera unit.

At step S162, the first threshold value is set.

At step S163, the zoom magnification of the current frame image is compared against the first threshold value, and a comparison result is obtained.

At step S164, the first camera unit is switched to the second camera unit according to the comparison result.

Optionally, in the embodiment of the present disclosure, when the electronic device have two camera units with different fields of view, the first threshold value may be set to be not less the zoom magnification of the camera unit which has a smaller field of view in both the first camera unit and the second camera unit.

Figure 2A:
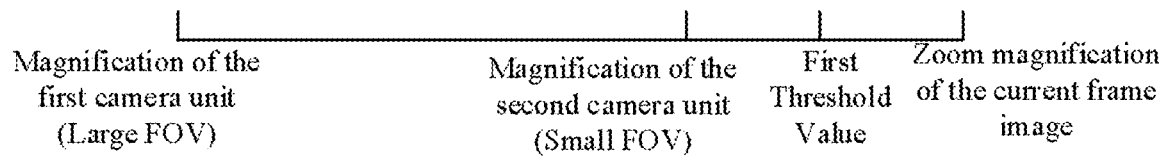
FIG. 2(a) and FIG. 2(b) are zooming methods for electronic devices with two camera units having different fields of view according to embodiments of the present disclosure.
Figure 2B:
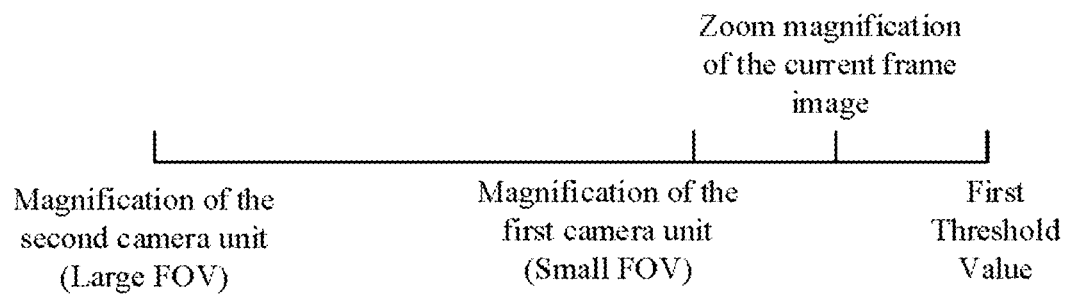

FIG. 2(a) and FIG. 2(b) are zooming methods for electronic devices with two camera units having different fields of view according to embodiments of the present disclosure.

Referring to FIG. 2(a), when the field of view of the first camera unit is larger than the field of view of the second camera unit, the first threshold value is set to be not less than the zoom magnification of the second camera unit; the zoom magnification of the current frame image is compared against the first threshold value, and the first camera unit is switched to the second camera unit when the comparison result indicates the zoom magnification of the current frame image is not less than the first threshold value.

Oppositely, referring to FIG. 2(b), when the field of view of the first camera unit is smaller than the field of view of the second camera unit, the first threshold value is set to be not less than the zoom magnification of the first camera unit; the zoom magnification of the current frame image is compared against the first threshold value, and the first camera unit is switched to the second camera unit when the comparison result indicates the zoom magnification of the current frame image is not less than the zoom magnification of the first camera unit and is less than the first threshold value.

Optionally, the electronic device may have a plurality of camera units. The plurality of camera units may have different fields of view, and may be independently installed at different positions of the electronic device, or may be installed on the electronic device in an embedded or external manner by being partially or fully integrated into one camera or multiple camera modules.

Optionally, in the embodiment of the present disclosure, when the electronic device has at least three camera units with different fields of view, it can be divided into the following cases:

(1) when the field of view of the first camera unit is larger than the field of view of the second camera unit, the first threshold value is set to be not less than the zoom magnification of the second camera unit; and the first camera unit is switched to the second camera unit when the zoom magnification of the current frame image is not less than the first threshold value.

Optionally, in the case of (1), when the field of view of the first camera unit is larger than the field of view of the second camera unit and there exists at least one camera unit having a field of view that is less than the second camera unit, a camera unit is regarded as a third camera unit if the field of view of the camera unit is less than the field of view of the second camera unit and the difference between the fields of view of the camera unit and the second camera unit is smallest, the first threshold value is set to be not less than the zoom magnification of the second camera unit and not greater than the zoom magnification of the third camera unit; and the first camera unit is switched to the second camera unit when the zoom magnification of the current frame image is not less than the first threshold value and is less than the zoom magnification of the third camera unit.

(2) when the field of view of the first camera unit is smaller than the field of view of the second camera unit, the first threshold value is set to be not less than the zoom magnification of the first camera unit; and the first camera unit is switched to the second camera unit when the zoom magnification of the current frame image is not less than the first camera unit and is less than the first threshold value.

Optionally, in the case of (2), when the field of view of the first camera unit is smaller than the field of view of the second camera unit and there exists at least one camera unit having a field of view that is less than the first camera unit, a camera unit is regarded as a third camera unit if the field of view of the camera unit is less than the field of view of the first camera unit and the difference between the fields of view of the camera unit and the first camera unit is smallest, the first threshold value is set to be not less than the zoom magnification of the first camera unit and not greater than the zoom magnification of the third camera unit; and the first camera unit is switched to the second camera unit when the zoom magnification of the current frame image is not less than the zoom magnification of the first camera unit and is less than the first threshold value.

(3) when the field of view of the first camera unit is smaller than the field of view of the second camera unit and there exists at least one camera unit having a field of view between the fields of view of the first camera unit and the second camera unit, a camera unit is regarded as a third camera unit if the field of view of the camera unit is less than the field of view of the second camera unit and the difference between the fields of view of the camera unit and the second camera unit is smallest, the first threshold value is set to be not less than the zoom magnification of the third camera unit and not greater than the zoom magnification of the first camera unit; and the first camera unit is switched to the second camera unit when the zoom magnification of the current frame image is not less than the zoom magnification of the third camera unit and is less than the first threshold value.

Optionally, in the case of (3), when there exist a plurality of camera units having fields of view between the fields of view of the first camera unit and the second camera unit, a camera unit is regarded as a third camera unit if the field of view of the camera unit is less than the field of view of the second camera unit and the difference between the fields of view of the camera unit and the second camera unit is smallest, and a camera unit is regarded as a fourth camera unit if the field of view of the camera unit is less than the second camera unit and the difference between the fields of view of the camera unit and the second camera unit is only greater than the difference between the fields of view of the third camera unit and the second camera unit, the first threshold value is set to be not less than the zoom magnification of the third camera and not greater than the zoom magnification of the fourth camera unit; and the first camera unit is switched to the second camera unit when the zoom magnification of the current frame image is not less than magnification of the third camera unit and is less than the first threshold value.

Therefore, any two of the plurality of the camera units may be intelligently switched based on the above rule.

For example, when an electronic device has three camera units, i.e., a telephoto camera, a wide-angle camera and an ultra-wide-angle camera. The field of view of the telephoto camera is less than that of the wide-angle camera, and the field of view of the wide-angle camera is less than that of the ultra-wide-angle camera. There are six switching modes, i.e., (1) switching from the telephoto camera to the wide-angle camera; (2) switching from the telephoto camera to the ultra-wide-angle camera; (3) switching from the wide-angle camera to the telephoto camera; (4) switching from the wide-angle camera to the ultra-wide-angle camera; (5) switching from the ultra-wide-angle camera to the telephoto camera; and (6) switching from the ultra-wide-angle camera to the wide-angle camera.

The following will specifically explain how to implement the six switching modes according to the above rules.

In the first switching mode, that is, (1) switching from the telephoto camera to the wide-angle camera, the telephoto camera is regarded as the first camera unit, the wide-angle camera is regarded as the second camera unit, the first threshold value is set to be not less than the zoom magnification of the telephoto camera, the telephoto camera is switched to the wide-angle camera when the zoom magnification of the current frame image is not less than the zoom magnification of the telephoto camera and less than the first threshold value.

In the second switching mode, that is, (2) switching from the telephoto camera to the ultra-wide-angle camera, the telephoto camera is regarded as the first camera unit, the ultra-wide-angle camera is regarded as the second camera unit, when there exists a wide-angle camera having a field of view between the fields of view of the telephoto camera and the ultra-wide-angle camera, the wide-angle camera is regarded as the third camera unit if the field of view of the wide-angle camera is less than the ultra-wide-angle camera and the difference between the field of view of the wide-angle and the field of view of the ultra-wide-angle camera is the smallest, the first threshold value is set to be not less than the zoom magnification of the wide-angle camera and not greater than the zoom magnification of the telephoto camera, and the telephoto camera is switched to the ultra-wide-angle camera when the zoom magnification of the current frame image is not less than the zoom magnification of the wide-angle camera and less than the first threshold value.

In the third switching mode, that is, (3) switching from the wide-angle camera to the telephoto camera, the wide-angle camera is regarded as the first camera unit, the telephoto camera is regarded as the second camera unit, the first threshold value is set to be not less than the zoom magnification of the telephoto camera, and the wide-angle camera is switched to the telephoto camera when the zoom magnification of the current frame image is not less than the first threshold value.

In the fourth switching mode, that is, (4) switching from the wide-angle camera to the ultra-wide-angle camera, the wide-angle camera is regarded as the first camera unit, the ultra-wide-angle camera is regarded as the second camera unit, when there exists a telephoto camera having a field of view less than the wide-angle camera, the telephoto camera is regarded as the third camera unit if the field of view is less than the field of view of the wide-angle camera and the difference between the fields of view of the telephoto camera and the wide-angle camera is smallest, the first threshold value is set to be not less than the zoom magnification of the wide-angle camera and not greater than the zoom magnification of the telephoto camera, the wide-angle camera is switched to the ultra-wide-angle camera when the zoom magnification of the current frame image is not less than the zoom magnification of the wide-angle camera and less than the first threshold value.

In the fifth switching mode, that is, (5) switching from the ultra-wide-angle camera to the telephoto camera, the ultra-wide-angle camera is regarded as the first camera unit, the telephoto camera is regarded as the second camera unit, the first threshold value is set to be not less than the zoom magnification of the telephoto camera, and the ultra-wide-angle camera is switched to the telephoto camera when the zoom magnification of the current frame image is not less than the first threshold value.

In the sixth switching mode, that is, (6) switching from the ultra-wide-angle camera to the wide-angle camera, the ultra-wide-angle camera is regarded as the first camera unit, the wide-angle camera is regarded as the second camera unit, when there exists a telephoto camera having a field of view less than the wide-angle camera, the telephoto camera is regarded as the third camera unit if the field of view is less than the wide-angle camera and the difference between the third camera unit and the wide-angle camera is smallest, the first threshold value is set to be not less than the zoom magnification of the wide-angle camera and not greater than the zoom magnification of the telephoto camera, and the ultra-wide-angle camera is switched to the wide-angle camera when the zoom magnification of the current frame image is not less than the first threshold value and less than the zoom magnification of the telephoto camera.

It can be known that by reasonably setting the first threshold value, any two of the three camera units can be intelligently switched between the any two of the three camera units to obtain a better camera effect according to the comparison result of the zoom magnification of the current frame image and the first threshold value. The first threshold value here is set according to the zoom magnifications of the camera units, and those skilled in the art may know that the first threshold value may also be set according to other parameters (such as the field of the view) of the camera units.

Of course, the examples of the above three camera units are only for explaining the present disclosure, and according to the above description, those skilled in the art can expand to an electronic device having a plurality of camera units, and any two of the plurality of camera units can be intelligently switched to obtain a better camera effect according to the zoom magnification input by users.

However, the above zooming method may have a problem of image jump when switching camera units.

Figure 3:
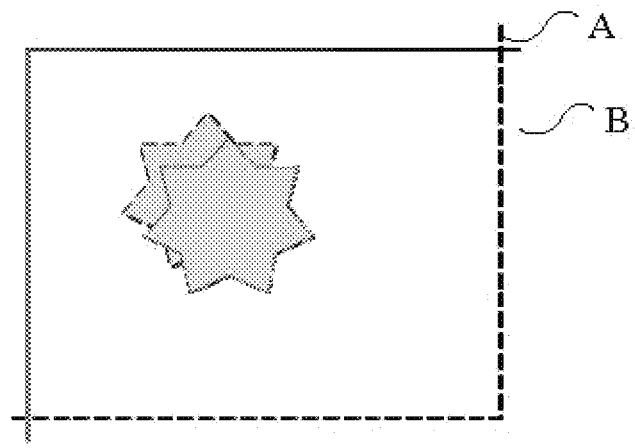
FIG. 3 is the image jump presented when using a zooming method according to an embodiment of the present disclosure.

FIG. 3 is the image jump presented when using a zooming method according to an embodiment of the present disclosure. As shown in FIG. 3, image A is the current frame image acquired by the first camera unit, image B is the second image acquired by the second camera unit after the first camera unit is switched to the second camera unit. As can be seen from FIG. 3, the center point of the image A and the center point of the image B may be inconsistent when switching the camera units, and the problem of image jump occurs.

The present disclosure provides a zooming method for implementing smooth switching by adjusting a current frame image A acquired by the first camera unit or the second image B acquired by the second camera unit, to solve the problem of image jump when switching camera units.

Figure 4:
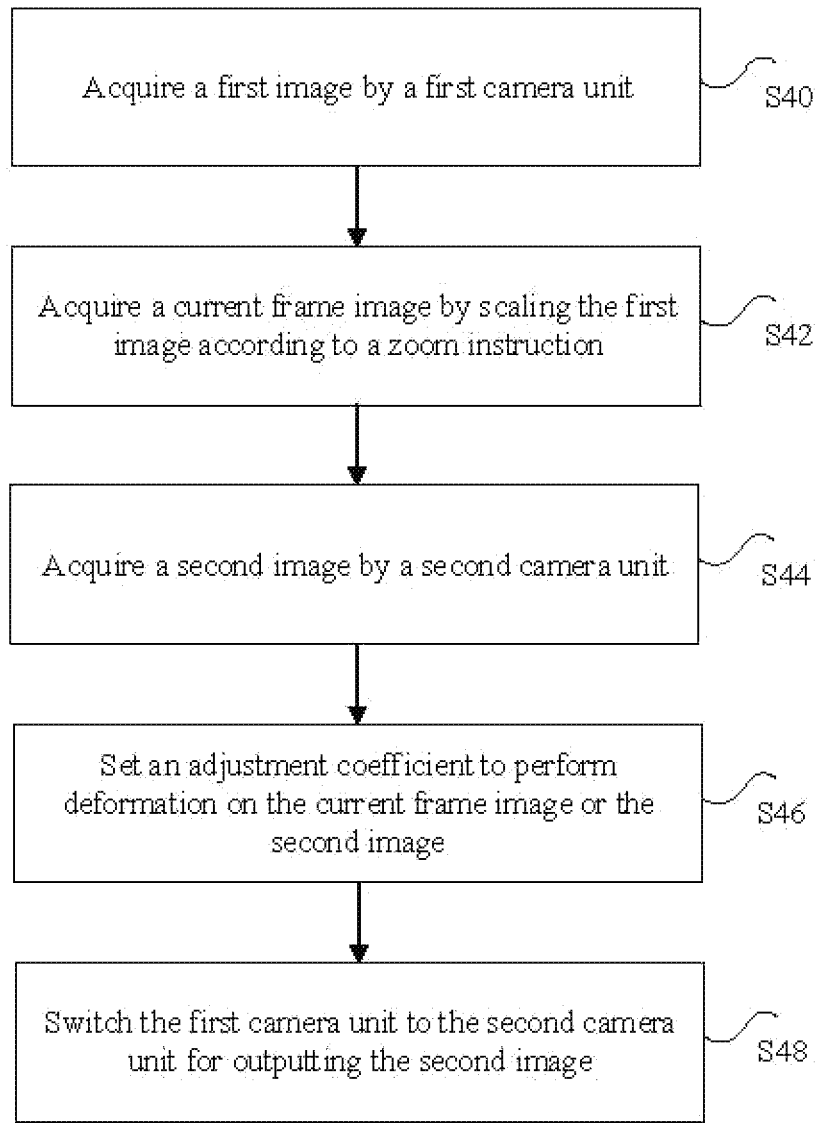
FIG. 4 is a flowchart of another zooming method according to an embodiment of the present disclosure.

FIG. 4 is a flowchart of another zooming method according to an embodiment of the present disclosure. As shown in FIG. 4, the method may include the following steps S40 to S48.

At S40, the first image is acquired by the first camera unit;

At S42, the current frame image is acquired by scaling the first image according to the zoom magnification;

At S44, the second image is acquired by the second camera unit;

At S46, the adjustment coefficient is set to perform deformation on the current frame image or the second image;

At S48, the first camera unit is switched to the second camera unit for outputting the second image.

In the embodiments of the present disclosure, through the above described steps, that is, the first image is acquired by the first camera unit; the current frame image is acquired by scaling the first image according to the zoom magnification; the second image is acquired by the second camera unit; the adjustment coefficient is set to perform the deformation on the current frame image or the second image; and the first camera unit is switched to the second camera unit for outputting the second image. Thus, in addition to being able to switch the first camera unit to the second camera unit according to the zoom instruction, the adjustment coefficient may also be set to perform deformation on the current frame image or the second image, to reduce the difference between the current frame image and the second image, thereby realizing the smooth transition from the current frame image to the second image to solve the problem of image jump when switching the first camera unit to the second camera unit.

It should be noted that, after acquiring the first image or the second image, the method further includes adjusting information, such as the automatic exposure (AE) information, the automatic white balance (AWB) information, the automatic focus (AF) information, etc., of the first image or the second image, to correct the color, brightness, etc., of the first image or the second image.

The above steps S40, S42, S44 and S48 are the same as the former described steps S10, S12, S14 and S16, and will not be described herein again for simplify the description.

The following will describe the step S46 in detail.

In the embodiment of the present disclosure, the step S46 may include the following steps S461 to S464.

At step S461, the deformation parameters of the current frame image and the second image are acquired by matching the current frame image and the second image.

In the embodiment of the present disclosure, matching the current frame image acquired by the first camera unit and the second image acquired by the second camera unit may include: marking pixel points, feature points or feature blocks on the current frame image and the second image respectively, and matching pixel points, feature points or feature blocks by image registration methods such as sparse optical flow, dense optical flow and block matching.

In the embodiment of the present disclosure, the acquired deformation parameters may be offset value, brightness difference, color difference, etc. between the pixel points, feature points or feature blocks.

Those skilled in the art can also use other methods to match the current frame image and the second image to acquire the deformation parameters between the current frame image and the second image without making creative efforts.

At step S462, the difference between the zoom magnification of the current frame image and the first threshold value is calculated.

It should be noted that the calculation will be different when the first threshold value is set according to different parameters of the camera unit, for example, when the first threshold value is set according to the fields of view of the camera units, the difference between the field of view of the current frame image and the first threshold value is calculated.

At step S463, the adjustment coefficient is set according to the deformation parameters and the difference.

The adjustment coefficient is less when the difference between the zoom magnification of the current frame image and the first threshold value is greater; and oppositely, the adjustment coefficient is greater when the difference between the zoom magnification of the current frame image and the first threshold value is less.

At step S464, the current frame image or the second image is deformed according to the adjustment coefficient.

Figure 5:
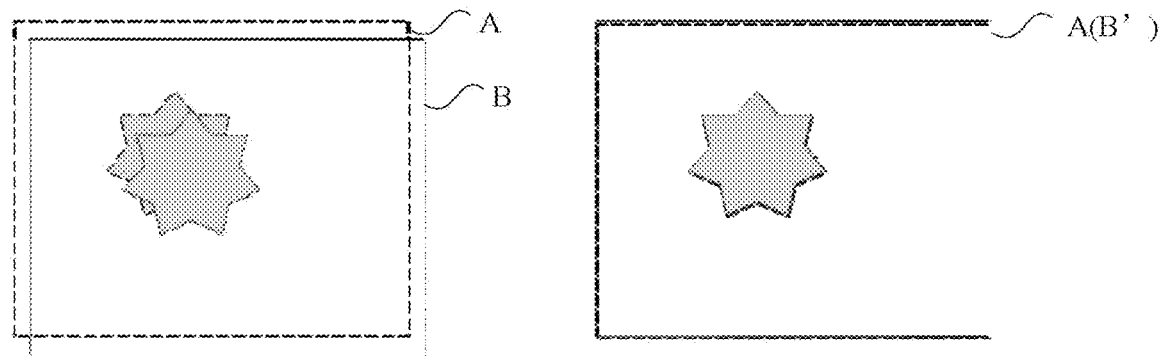
FIG. 5 shows an image switching process when performing the deformation on a current frame image.
Figure 6:
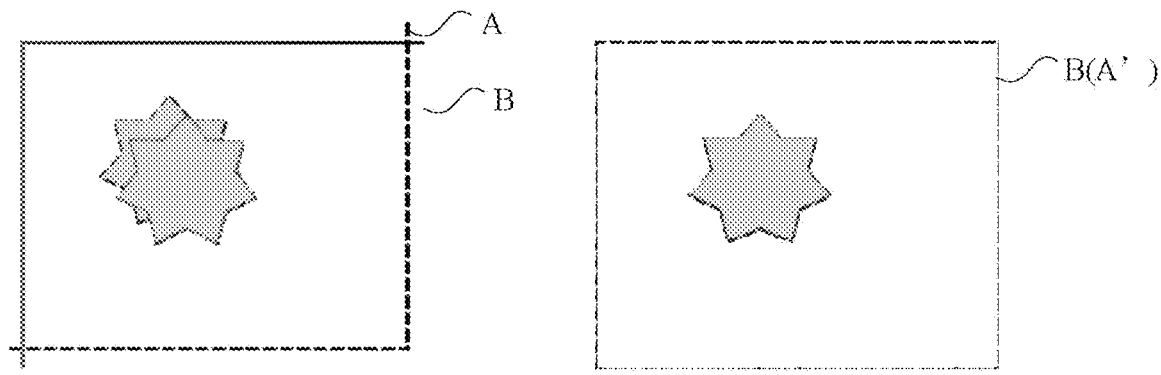
FIG. 6 shows an image switching process when performing the deformation on a second image.

It should be noted that the step is aimed to reduce or even eliminate the difference between the current frame image and the second image, to realize smooth transition between the current frame image and the second image when the first camera unit is switched to the second camera unit, thereby solving the problem of image jump. Therefore, the current frame image may be deformed to align the deformed current frame image with the second image, or the second image may be deformed to align the current frame image and the deformed second image. FIG. 5 and FIG. 6 show image switching processes when performing the deformation on the current frame image and the second image respectively. In FIG. 5, image A represents the current frame image acquired by the first camera unit, image A' represents the deformed current frame image, and image B represents the second image acquired by the second camera unit. In FIG. 6, image A represents the current frame image acquired by the first camera unit, image B represents the second image acquired by the second camera unit, and image B' represents the deformed second image. It can be seen from FIG. 5 and FIG. 6 that the two images can be completely aligned to achieve smooth transition between images no matter the current frame image is deformed or the second image is deformed.

Figure 7A:
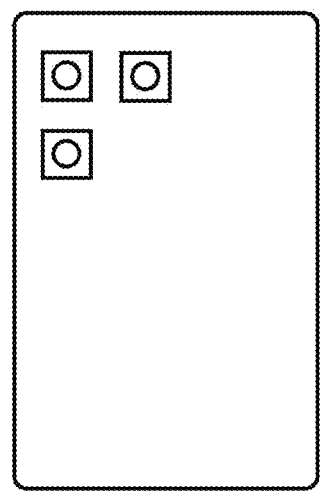
FIG. 7(a) to FIG. 7(c) are electronic devices having different camera positions according to embodiments of the present disclosure.
Figure 7B:
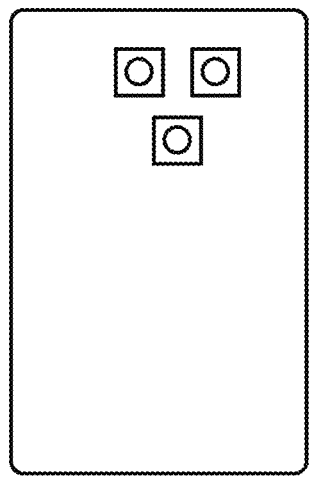
Figure 7C:
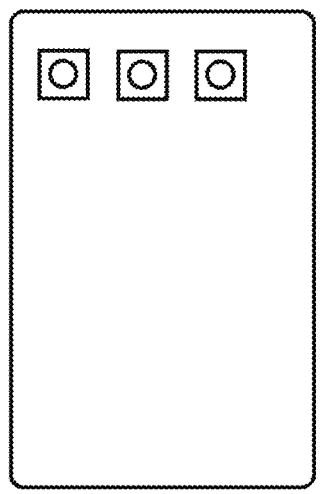

The embodiment of the present disclosure can be applied in an electronic device having a plurality of camera units. FIG. 7(a) to FIG. 7(c) are electronic devices having different camera positions according to embodiments of the present disclosure. It can be seen that the plurality of camera units can be independently installed at different positions of the electronic device. The plurality of camera units can include at least two camera units having different fields of view.

Of course, FIG. 7(a) to FIG. 7(c) are merely examples of the electronic devices having three camera units. Those skilled in the art may know that the number and positions of the plurality of the camera units in the electronic device can be adjusted according to practical requirements, but are not limited to the examples shown in FIG. 7(a) to FIG. 7(c). For example, the number of the plurality of camera units may be 3 or more, and a part of or all of the plurality of camera units may have different fields of view, and the plurality of camera units may be independently installed at different positions of the electronic device, or be installed on the electronic device in an embedded or external manner after being partially or fully integrated into one or more camera modules.

In another embodiment of the present disclosure, an electronic device is provided, which includes: a processor; and a memory for storing executable instructions of the processor; where the processor is configured to perform any of above-mentioned zooming methods by executing the executable instructions.

In another embodiment of the present disclosure, a storage medium for storing programs is provided, where a device in which the storage medium is stored is controlled to execute any of the zooming methods when the program is running.

In another embodiment of the present disclosure, an apparatus is also provided, the apparatus includes a processor, a memory, and programs stored in the memory and executable by the processor, the following steps are performed when the processor executes the programs: acquiring the first image by the first camera unit; acquiring the current frame image by scaling the first image according to the zoom instruction; acquiring the second image by the second camera unit; and switching the first camera unit to the second camera unit for outputting the second image.

Optionally, when the processor executes the programs, the current frame image is acquired at the moment when the zoom instruction input is completed.

Optionally, the first camera unit and the second camera unit have different fields of view.

Optionally, switching the first camera unit to the second camera unit includes: comparing the fields of view of the first camera unit against the second camera unit; setting a first threshold value; obtaining a comparison result by comparing a zoom magnification of the current frame image against the first threshold value; and switching the first camera unit to the second camera unit according to the comparison result.

Optionally, when the electronic device have two camera units with different fields of view, the first threshold value may be set to be not less the zoom magnification of the camera unit which has a smaller field of view in both the first camera unit and the second camera unit.

Optionally, when the field of view of the first camera unit is larger than the field of view of the second camera unit, the first threshold value is set to be not less than the zoom magnification of the second camera unit; the zoom magnification of the current frame image is compared against the first threshold value, and the first camera unit is switched to the second camera unit when the comparison result indicates the zoom magnification of the current frame image is not less than the first threshold value; and when the field of view of the first camera unit is smaller than the field of view of the second camera unit, the first threshold value is set to be not less than the zoom magnification of the first camera unit; the zoom magnification of the current frame image is compared against the first threshold value, and the first camera unit is switched to the second camera unit when the comparison result indicates the zoom magnification of the current frame image is not less than the zoom magnification of the first camera unit and is not greater than the first threshold value.

Optionally, when the field of view of the first camera unit is larger than the field of view of the second camera unit and there exists at least one camera unit having a field of view that is less than the second camera unit, a camera unit is regarded as a third camera unit if the field of view of the camera unit is less than the field of view of the second camera unit and the difference between the fields of view of the camera unit and the second camera unit is smallest, the first threshold value is set to be not less than the zoom magnification of the second camera and not greater than the zoom magnification of the third camera unit; and the first camera unit is switched to the second camera unit when the zoom magnification of the current frame image is not less than the first threshold value and is not greater than the zoom magnification of the third camera unit.

Optionally, when the field of view of the first camera unit is smaller than the field of view of the second camera unit and there exists at least one camera unit having a field of view that is less than the first camera unit, a camera unit is regarded as a third camera unit if the field of view of the camera unit is less than the field of view of the first camera unit and the difference between the fields of view of the camera unit and the first camera unit is smallest, the first threshold value is set to be not less than the zoom magnification of the first camera unit and not greater than the zoom magnification of the third camera unit; and the first camera unit is switched to the second camera unit when the zoom magnification of the current frame image is not less than zoom magnification of the first camera unit and is not greater than the zoom magnification of the first threshold value.

Optionally, when the field of view of the first camera unit is smaller than the field of view of the second camera unit and there exists at least one camera unit having a field of view between the fields of view of the first camera unit and the second camera unit, a camera unit is regarded as a third camera unit if the field of view of the camera unit is less than the field of view of the second camera unit and the difference between the fields of view of the camera unit and the second camera unit is smallest, the first threshold value is set to be not less than the zoom magnification of the third camera and not greater than the zoom magnification of the first camera unit; and the first camera unit is switched to the second camera unit when the zoom magnification of the current frame image is not less than zoom magnification of the third camera unit and is not greater than the first threshold value.

Optionally, when there exist a plurality of camera units having fields of view between the fields of view of the first camera unit and the second camera unit, a camera unit is regarded as a third camera unit if the field of view of the camera unit is less than the field of view of the second camera unit and the difference between the fields of view of the camera unit and the second camera unit is smallest, and a camera unit is regarded as a fourth camera unit if the field of view of the camera unit is less than the second camera unit and the difference between the fields of view of the camera unit and the second camera unit is only greater than the difference between the fields of view of the third camera unit and the second camera unit, the first threshold value is set to be not less than the zoom magnification of the third camera and not greater than the zoom magnification of the fourth camera unit; and the first camera unit is switched to the second camera unit when the zoom magnification of the current frame image is not less than magnification of the third camera unit and is not greater than the first threshold value.

Optionally, at least two of the plurality of camera units have different fields of view, and the zooming method is configured to realize the switch between any two of the plurality of camera units having different fields of view.

Optionally, the zooming method further includes: setting an adjustment coefficient to deform the current frame image or the second image.

Optionally, setting the adjustment coefficient to deform the current frame image or the second image comprising: acquiring a deformation parameter of the current frame image and the second image by matching the current frame image and the second image; calculating a difference between the zoom magnification of the current frame image and the first threshold value; setting the adjustment coefficient to the deformation parameter and the difference; and performing deformation on the current frame image or the second image according to the adjustment coefficient.

Optionally, acquiring the deformation parameter of the current frame image and the second image by matching the current frame image and the second image comprising: marking pixel points, feature points or feature blocks on the current frame image and the second image respectively; and matching the current frame image and the second image through an image registration method. Where the image alignment method includes at least one of the following: sparse optical flow, dense optical flow and block matching.

Optionally, the setting of the adjustment coefficient is related to the deformation coefficient; when the difference between the zoom magnification of the current frame image and the first threshold value is larger, the adjustment coefficient is smaller; and when the difference between the zoom magnification of the current frame image and the first threshold value is smaller, the adjustment coefficient is larger.

The present disclosure also provides a computer program product, the program is adapted to be executed with the initialized following steps when it is executed on a data processing device: acquiring the first image by the first camera unit; acquiring the current frame image by scaling the first image according to the zoom instruction; acquiring the second image by the second camera unit; and switching the first camera unit to the second camera unit, and outputting the second image.

The serial numbers of the embodiments of the present disclosure are merely for description, and do not represent the advantages and disadvantages of the embodiments.

In the above-mentioned embodiments of the present disclosure, the description of the various embodiments has different emphasis, and the parts that are not detailed in certain embodiment can be referred to the related description of other embodiments.

In the embodiments provided by the present disclosure, it should be understood that the disclosed technical contents may be implemented in other manner. The embodiment of the above described device is only an example, for example, the elements may be divided according to logical functions. In actual implementations, there may be another division manner, for example, multiple elements or components may be combined or integrated into another system, or some features can be ignored or not be executed. In addition, the mutual coupling or direct coupling or communication as shown or discussed can be an indirect coupling or communication through some interfaces, elements or components, and may be electrical or in other forms.

The elements described as separate components may be or may not be physical separated, the components shown as elements may be or may not be physical elements, that is, may be located in one place, or may be distributed to multiple elements. Some or all of the elements may be selected according to actual requirements to achieve the purpose of the solution according to the embodiment of the present disclosure.

In addition, the various function elements in the embodiments of the present disclosure may be integrated into one processing element, or each element may exist physically separately, or two or more elements may be integrated into one element. The above integrated element may be implemented in the form of hardware or in the form of a software functional element.

The integrated element, if implemented in the form of a software functional element and sold or used as an independent product, can be stored in a computer readable storage medium. Based on such understanding, the essential part or the part that contributes relative to the prior art, or the all or part of the technical solution of the present disclosure may be embodied in the form of a software product. The computer software product may be stored in a storage medium, and the storage medium includes a number of instructions to enable a computer device (may be a personal computer, a server or a network device, etc.) to execute all or part of the steps of the methods described in embodiments of the present disclosure. The storage medium includes: a U disk, a Read-Only Memory (ROM), a Random Access Memory (RAM), a removable hard disk, a magnetic disk or an optical disk, and other mediums for storing the program codes.

The above described are some exemplary embodiments of the present disclosure, and it should be noted that those skilled in the art may also make several improvements and amendments without departing from the principles of the present disclosure, and those improvements and amendments should be considered within the protection scope of the present disclosure.

What is claimed is:

1. A zooming method for an electronic device having a plurality of camera units, the zooming method comprising:
    acquiring a first image by a first camera unit;
    acquiring a current frame image by scaling the first image according to a zoom instruction;
    acquiring a second image by a second camera unit; and
    switching the first camera unit to the second camera unit for outputting the second image;
    wherein switching the first camera unit to the second camera unit comprising: comparing a size of fields of view of the first camera unit against a size of fields of view of the second camera unit; setting a first threshold value; obtaining a comparison result by comparing a zoom magnification of the current frame image against the first threshold value; and switching the first camera unit to the second camera unit according to the comparison result;
    wherein when the field of view of the first camera unit is larger than the field of view of the second camera unit, the first threshold value is set to be not less than a zoom magnification of the second camera unit; the zoom magnification of the current frame image is compared against the first threshold value, and the first camera unit is switched to the second camera unit when the comparison result indicates the zoom magnification of the current frame image is not less than the first threshold value.

2. The zooming method as claimed in claim 1, wherein the current frame image is acquired at a moment when a zoom instruction input is completed.

3. An electronic device, comprising:
    a processor; and
    a memory for storing executable instructions of the processor;
    wherein the processor is configured to perform the zooming method as claimed in claim 2 by executing the executable instructions.

4. The zooming method as claimed in claim 1, wherein the first camera unit and the second camera unit have different fields of view.

5. The zooming method as claimed in claim 1, wherein, when the electronic device has two camera units with different fields of view, the first threshold value is set to be not less than a zoom magnification of the camera unit which has a smaller field of view in both the first camera unit and the second camera unit.

6. The zooming method as claimed in claim 1, when the field of view of the first camera unit is smaller than the field of view of the second camera unit, the first threshold value is set to be not less than a zoom magnification of the first camera unit; the zoom magnification of the current frame image is compared against the first threshold value, and the first camera unit is switched to the second camera unit when the comparison result indicates the zoom magnification of the current frame image is not less than the zoom magnification of the first camera unit and is less than the first threshold value.

7. The zooming method as claimed in claim 1, wherein, when the field of view of the first camera unit is larger than the field of view of the second camera unit and there exists at least one camera unit having a field of view that is less than the second camera unit, a third camera unit is determined through the following method: a field of view of a camera unit is less than the field of view of the second camera unit and the difference between the fields of view of the camera unit and the second camera unit is smallest, the first threshold value is set to be not less than a zoom magnification of the second camera and not greater than a zoom magnification of the third camera unit; and the first camera unit is switched to the second camera unit when the zoom magnification of the current frame image is not less than the first threshold value and is less than the zoom magnification of the third camera unit.

8. The zooming method as claimed in claim 1, wherein, when the field of view of the first camera unit is smaller than the field of view of the second camera unit and there exists at least one camera unit having a field of view that is less than the first camera unit, a third camera unit is determined through the following method: wherein a field of view of a camera unit is less than the field of view of the first camera unit and the difference between the fields of view of the camera unit and the first camera unit is smallest, the first threshold value is set to be not less than a zoom magnification of the first camera unit and not greater than a zoom magnification of the third camera unit; and the first camera unit is switched to the second camera unit when the zoom magnification of the current frame image is not less than zoom magnification of the first camera unit and is less than a zoom magnification of the first threshold value.

9. The zooming method as claimed in claim 1, wherein, when the field of view of the first camera unit is smaller than the field of view of the second camera unit and there exists at least one camera unit having a field of view between the fields of view of the first camera unit and the second camera unit, a third camera unit is determined through the following method: wherein the field of view of the camera unit is less than the field of view of the second camera unit and the difference between the fields of view of the camera unit and the second camera unit is smallest, the first threshold value is set to be not less than a zoom magnification of the third camera unit and not greater than a zoom magnification of the first camera unit; and the first camera unit is switched to the second camera unit when the zoom magnification of the current frame image is not less than zoom magnification of the third camera unit and is less than the first threshold value.

10. The zooming method as claimed in claim 1, wherein, when there exist a plurality of camera units having fields of view between the fields of view of the first camera unit and the second camera unit, a third camera unit is determined, wherein a field of view of the third camera unit is less than the field of view of the second camera unit and the difference between the fields of view of the camera unit and the second camera unit is smallest, and a fourth camera unit is determined, a field of view of the fourth camera unit is less than the second camera unit and the difference between the fields of view of the camera unit and the second camera unit is only greater than the difference between the fields of view of the third camera unit and the second camera unit, the first threshold value is set to be not less than a zoom magnification of the third camera and not greater than a zoom magnification of the fourth camera unit; and the first camera unit is switched to the second camera unit when the zoom magnification of the current frame image is not less than magnification of the third camera unit and is less than the first threshold value.

11. The zooming method as claimed in claim 1, wherein, at least two of the plurality of camera units have different fields of view, and the zooming method is configured to realize a switch between any two of the plurality of camera units having different fields of view.

12. The zooming method as claimed in claim 1, wherein, the zooming method further comprises: setting an adjustment coefficient to deform the current frame image or the second image.

13. The method as claimed in claim 12, wherein setting the adjustment coefficient to deform the current frame image or the second image comprising:
acquiring a deformation parameter of the current frame image and the second image by matching the current frame image and the second image;
calculating a difference between a zoom magnification of the current frame image and a zoom magnification the first threshold value;
setting the adjustment coefficient to the deformation parameter and the difference; and
performing deformation on the current frame image or the second image according to the adjustment coefficient.

14. The method as claimed in claim 13, wherein, acquiring the deformation parameter of the current frame image and the second image by matching the current frame image and the second image comprising:
marking pixel points, feature points or feature blocks on the current frame image and the second image respectively; and
matching the current frame image and the second image through an image registration method.

15. The method as claimed in claim 13, wherein, the setting of the adjustment coefficient is related to the deformation coefficient;
when the difference between the zoom magnification of the current frame image and the zoom magnification of the first threshold value is larger, the adjustment coefficient is smaller; and
when the difference between the zoom magnification of the current frame image and the first threshold value is smaller, the adjustment coefficient is larger.

16. A storage medium, wherein the storage medium comprises a stored program, wherein a device in which the storage medium is stored is controlled to execute the zooming method as claimed in claim 1 when the program is running.

17. An electronic device, comprising:
a processor; and
a memory for storing executable instructions of the processor;
wherein the processor is configured to perform the zooming method as claimed in claim 1 by executing the executable instructions.

18. An electronic device having a plurality of camera units, wherein, the electronic device comprises:
at least two camera units having different fields of view, configured to acquire the first image and the second image;
an input unit, configured to acquire a zoom instruction;
a processing unit, configured to acquire a current frame image by scaling the first image according to the zoom instruction;
a control unit, configured to switch one camera unit to another camera unit of the at least two camera units having different fields of view according to the zoom instruction; and
a display unit, configured to output the second image;
the control unit further configured to compare a size of fields of view of the first camera unit against a size of fields of view of the second camera unit; set a first threshold value; obtain a comparison result by comparing a zoom magnification of the current frame image against the first threshold value; and switch the first camera unit to the second camera unit according to the comparison result;
wherein, when the field of view of the first camera unit is larger than the field of view of the second camera unit, the first threshold value is set to be not less than a zoom magnification of the second camera unit; the zoom magnification of the current frame image is compared against the first threshold value, and the first camera unit is switched to the second camera unit when the comparison result indicates the zoom magnification of the current frame image is not less than the first threshold value.

19. The electronic device as claimed in claim 18, wherein the processing unit is further configured to set an adjustment coefficient for performing the deformation on the current frame image or the second image.

* * * * *